Oct. 3, 1950            E. C. STAUFFER            2,524,608
HOT WATER BOILER REGULATOR FOR HEATING
LIQUID FUEL FOR OIL BURNERS
Filed April 14, 1945            2 Sheets-Sheet 1

INVENTOR.
EARL C. STAUFFER

Oct. 3, 1950 E. C. STAUFFER 2,524,608
HOT WATER BOILER REGULATOR FOR HEATING
LIQUID FUEL FOR OIL BURNERS
Filed April 14, 1945 2 Sheets-Sheet 2

INVENTOR.
EARL C. STAUFFER
by Harold J. Borthwick
attorney

Patented Oct. 3, 1950

2,524,608

UNITED STATES PATENT OFFICE 2,524,608

HOT-WATER BOILER REGULATOR FOR HEATING LIQUID FUEL FOR OIL BURNERS

Earl C. Stauffer, Lancaster, Pa.

Application April 14, 1945, Serial No. 588,303

2 Claims. (Cl. 158—36)

My invention relates to heating systems and method of operating the same and is directed particularly to those heating systems which include a boiler fired by a fluid fuel burner, such as an oil burner.

The main object of my invention is to increase the efficiency of such heating systems by maintaining the fluid fuel at an elevated temperature to thereby present heated fuel to the burner for ignition and combustion.

A further object of my invention is to provide a heating boiler wherein a portion of the conduit which conveys fuel to the burner passes through a water leg of the boiler to thereby effect a transfer of heat from the water in the boiler to the fuel which is fed through the conduit to the burner.

Another object of my invention is to provide a heating boiler which may be substantially completely preassembled at the factory, ready for installation at the place of use, including an arrangement whereby the conduit from the source of fuel supply to the burner may be readily and easily passed through the water leg or chamber of the boiler at the time of installation; the arrangement thereafter effecting a preheating of the fuel prior to combustion.

In another aspect my invention aims to provide a method of operating a heating system whereby the quantity of fuel consumed may be reduced and the burner operated at higher efficiency than now possible.

Other objects of the invention will be apparent from the detailed description which follows:

The system of my invention will work well with hot water, steam, and vapor type systems, and also with so-called "split systems" in which heat is indirectly transferred from the burning fuel to air through a heat transfer fluid such as water or steam and the heated air is conveyed to the areas to be heated by air ducts, as well as other similar systems. The description which follows will be generally directed to a hot water type system for purposes of illustration for with such a system the utmost advantage is obtained by the present invention. The specification, however, will indicate generally the manner in which the system of the present invention will operate with steam, or vapor, indirect forced warm air and the like, but those skilled in the art will have no difficulty in understanding the application of the present invention to other heating systems in which a heat transfer fluid is employed. My invention is applicable to any systems which include a boiler that receives a heat transfer fluid, generally water, which is heated by a fluid fuel burner, such as an oil burner.

From research work which has been conducted in the burning of fluid fuels, and particularly fuel oil, it has been clearly demonstrated that better and more complete combustion of the fuel is obtained if the temperature of the fuel is elevated. By such improved combustion a greater B. t. u. value per pound of fuel is made available. I have further found that a given fluid fuel burner will operate at peak efficiency only when it receives fuel which has been heated to a substantially uniform temperature to which the burner has been adjusted.

The preferred system of my invention includes a hot water boiler and an oil burner for heating the water in the boiler. An immersion aquastat or the like is provided for controlling the operation of the burner to maintain the water in the boiler within a limited predetermined range, generally within 10 to 15 degrees above or below a desired boiler temperature. An arrangement is provided for supplying oil to the burner at a substantially uniform elevated temperature, approximately within the temperature range of the water in the boiler, such arrangement including a conduit which passes through the boiler in good heat transfer relationship with the water therein.

My invention also includes a boiler having a heat transfer fluid chamber therein and a conduit for the supply of fluid fuel passing through the compartment to be heated by the heat transfer fluid.

In order that my invention may be readily understood, I will describe the same in conjunction with the attached drawings in which.

Figure 1:
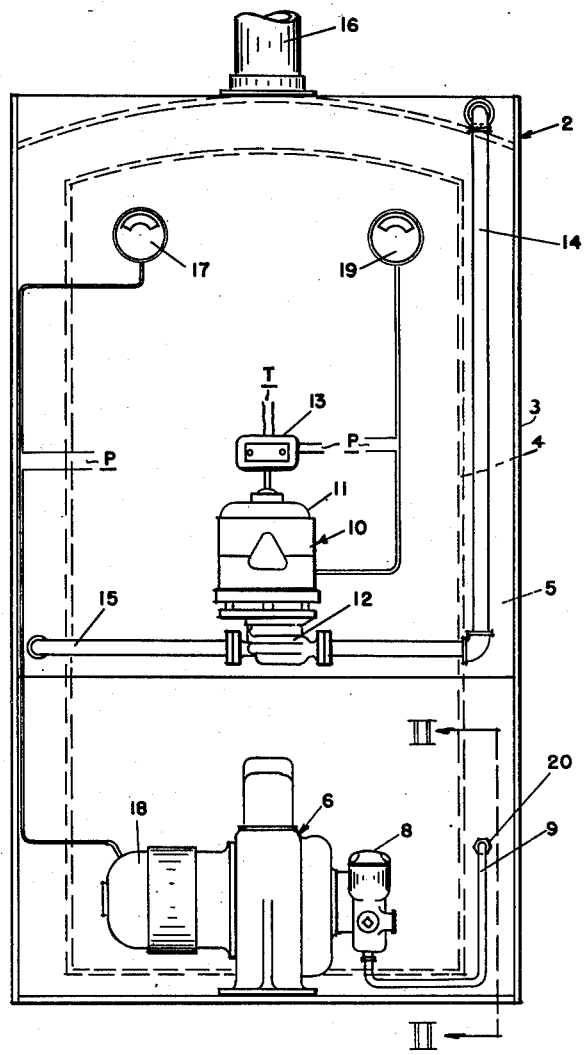
Figure 1 is a front elevational view showing an oil fired boiler-burner unit.

Referring first to Figure 1, there is shown a boiler 2 which in the illustrative embodiment is fabricated of steel. The boiler 2 may be of any conventional design including an outer wall or shell member 3 having an inner wall or fire box member 4 with a compartment 5 formed therebetween for the reception of a heat transfer fluid such as water.

The boiler shown and described in my United States Patent No. 2,119,606, issued June 7, 1938, is particularly well suited for use with the present system for it is formed of fabricated plate steel, and is arranged to be completely preassembled with a burner unit at the factory prior to delivery to the user.

Figure 2:
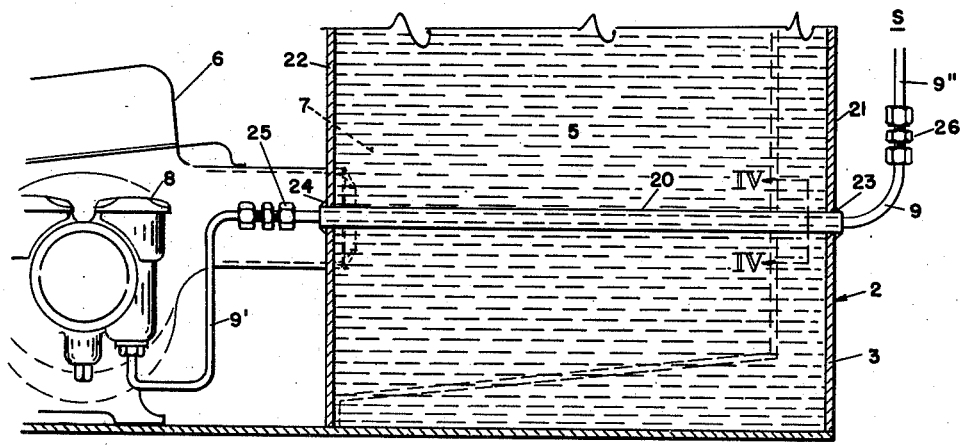
Figure 2 is a sectional view on an enlarged scale taken along the line II—II of Figure 1, illustrating one arrangement for inserting the fuel supply conduit in the heat transfer fluid compartment of the boiler.

An oil burner unit 6 is positioned to direct burning fuel into the firebox 7 of the boiler, shown in Figure 2. The burner 6 is generally provided with a fuel pump 8 which is effective for bringing fuel from a source of supply S remote from the boiler, through a conduit 9, to the burner nozzle. The source of fuel supply may be a tank disposed in the furnace room or a tank buried in the ground outside the building where the boiler is installed. The tank is generally of relatively large capacity and the oil cannot be conveniently heated in the storage tank.

In hot water heating systems, it is now quite common to force the water from the boiler to the radiators by the use of a water pump or so-called circulator positioned in the return line and inducing mechanically a positive circulation of the water. In Figure 1, a circulator 10 is shown. The circulator includes an electric motor 11 and an impeller pump 12. Operation of the motor 11 is generally controlled by a thermostat T, diagrammatically indicated but not shown in Figure 1. In normal use, the thermostat is positioned in the area to be heated. The thermostat may serve to directly control the motor 11, but preferably it acts through a relay 13, which connects the motor 11 to a source of power P when the room thermostat T calls for heat.

In the operation of such systems, when the temperature in the area to be heated reaches a minimum degree, the room thermostat connects the motor 11 with its source of power P and the pump 12 is actuated and heat transfer fluid disposed in the radiators is pumped through the return line 14, through the pump 12 and the line 15 into the water leg or compartment 5. As water is drawn into the return line 14, it is replaced by heated water which passes upwardly through the outlet or feed line 16 to the radiators.

Operation of the oil burner 6 is controlled by a device such as an aquastat 17, provided with an element disposed within the heat transfer fluid compartment 5 of the boiler 2. The aquastat 17 is effective for controlling the supply of current from the common source P to the motor 18 of the oil burner 6 and to the electrical ignition system if the oil burner has an electrical igniter. The aquastat may be set, for example, to energize the motor 18 when the temperature of the water in the boiler falls below, let us say, 160° F., and to disconnect the motor 18 from the source of current supply P when the temperature of the water reaches 180° F. Thus the heat transfer fluid in the water leg 5 of the boiler will be constantly maintained at an elevated temperature within a predetermined range—in the example given for illustration, between about 160° F. and 180° F.

In some installations it is desirable to provide a second aquastat 19 which is interconnected with the motor 11 for the circulator 10 and is effective for shutting down the operation of the circulator unless the temperature of the heat transfer fluid in the boiler is above a minimum degree. For example, in the embodiment described above where the water temperature is maintained between 160° F. and 180° F., the aquastat 19 may be set to shut down the circulator should the boiler water temperature fall to 160° F. and to effect reenergization of the motor 11 for the circulator upon the temperature of the water reaching approximately 170° F. The aquastat 19 may be dispensed with, but it is desirable where the load on the boiler is substantial and the circulator 10 is effective for displacing a relatively large volume of water. Under such conditions there is some likelihood that the discharge of heat transfer fluid from the radiators to the boiler will reduce the temperature of water in the boiler to a temperature substantially below the minimum desired.

From the foregoing, it will be clear that, with a hot water system of the type described, the temperature of the water in the boiler will be maintained at all times within predetermined limits.

As previously mentioned, I have determined that by elevating the temperature of the fluid fuel at the time of its presentation to the burner for ignition and combustion, a substantial improvement in burner efficiency is obtained. I have determined that as much as 4% of fuel may be saved by maintaining the fuel fed to the burner between 160° F. and 180° F. at the time of presentation for ignition. For maximum economy, of course, it is necessary that the oil be maintained at a substantially uniform temperature; maximum operating efficiency requires adjustment of the burner for each substantial change in the temperature of the fuel supplied for combustion. It is not possible, therefore, to obtain the same economy by disposing a portion of the fuel line directly within the combustion chamber where it will be heated by the products of combustion, for when the burner starts in operation, the temperature of the oil will be low, but after a period of operation the temperature will be relatively high—too high, in fact, for proper operation.

According to the present invention, the supply conduit 9 which conveys oil from the storage tank or other external source S passes directly through the water leg 5 of the boiler. This may be accomplished in different ways and at different locations. One preferred arrangement is shown in Figures 1 and 2. In this embodiment a tube 20 passes completely through the boiler 2 from the rear wall 21 and through the front wall 22. As will be seen from Figure 1, the tube 20 is disposed centrally between the walls 3 and 4 which constitute the vertical, side portion of the water leg or compartment 5, and thus the tube 20 is bathed in the water within the boiler. I prefer to install the tube 20 on the side of the boiler opposite that into which the return line 15 extends into the boiler to thereby avoid any momentary chilling which might result from pumping relatively cool or cold water from the radiators into the boiler. When the fuel pump 8 is mounted on the right side of the burner as shown in Figure 1, the return inlet is preferably provided on the left-hand side and vice versa when the fuel pump is mounted on the left side.

The tube 20 is welded or brazed in place as indicated at 23 and 24. Thus the tube 20 extends completely through the boiler and its outer periphery is sealed at opposite ends to the front and back walls of the boiler preventing leakage so that the conduit 9 may be inserted or removed without draining the boiler.

With this assembly, the conduit 9 may be either installed with the burner at the factory or may be inserted by the workman at the place of use. A convenient assembly arrangement is shown in Figure 2 where the conduit 9 is provided in three sections 9, 9' and 9''. The section 9 passes through the conduit 20 and is connected to the section 9' which is fastened to the fuel pump 8 by a tubing union 25 of conventional construction. The opposite end of the section 9 is connected to section 9'' which leads to the source S, a tubing union 26 being employed. A single conduit may be used to connect the burner with the source of fuel supply, but where preassembly is effected at the factory, it may be desirable to use a short length of conduit and a connector 26, or the arrangement shown in Figure 2 with two sections of conduit 9 and 9'.

Figure 4:
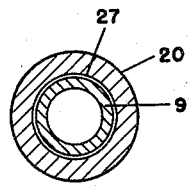
Figure 4 is an enlarged sectional view taken on the line IV—IV of Figure 2.

Figures 4 shows the conduit 9 disposed within the tube 20 and indicates the close fit at 27 between the parts. There is preferably sufficient clearance to permit ready insertion of the conduit 9, but the spacing is limited so as to insure good heat transfer from the tube 20 which is bathed in the boiler water to the conduit 9 and the fuel oil moving therethrough to the burner. In order to inhibit the passage of air through the narrow space 27 between the parts, an asbestos cement may be placed around the ends of the tube 20 where the conduit enters and leaves as shown in Figure 2. This has been found to be unnecessary when a snug fit is obtained between the tube and conduit. However, should there be an opening of considerable magnitude between the parts, it is desirable to seal off the free entrance of air which might result in the loss of heat and thus prevent the oil in the conduit 9 from attaining the desired elevated temperature.

Figure 3:
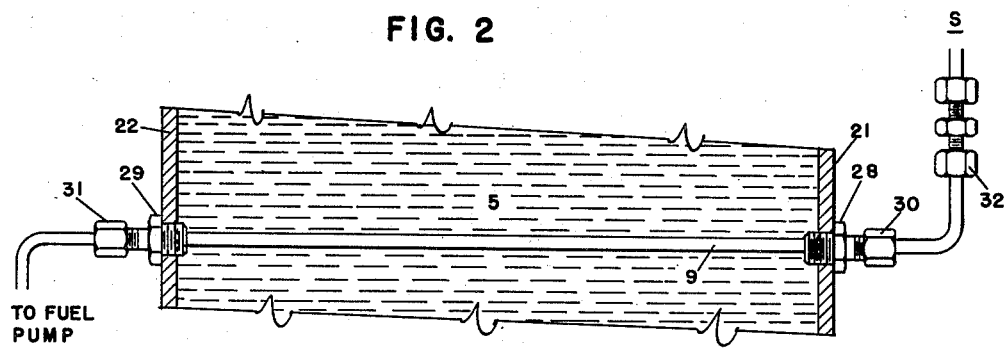
Figure 3 is an enlarged detail view, similar to Figure 2, showing a modified arrangement.

In Figure 3 there is shown a modified arrangement which may be preferred, particularly where the boiler and burner are preassembled at the factory and adjusted there, ready for installation by merely connecting to a source of fuel and electric current. With this arrangement a single section of conduit 9 is connected to the fuel pump (not shown in this figure) and passes through the water leg 5 of the boiler. The boiler walls 21 and 22 are tapped to receive packing bushings 28 and 29 which are threaded into the boiler walls and sealed with pipe compound in the usual manner. The conduit 9 passes through these bushings, and tubing packing nuts 30 and 31 are secured to threaded extensions on the bushings 28 and 29. This type of bushings and packing arrangement is well known and needs no detailed description. Where the conduit 9 is installed at the factory, a standard tubing union 32 is preferably provided. In installation it is only necessary to connect the feed line from the oil supply tank at the union 32. If this arrangement is installed at the place of use, the conduit 9 must be inserted and the packing nuts 30 and 31 drawn up prior to filling the boiler with water. In the embodiment shown in Figure 3, the conduit 9 is bathed directly in the water within the boiler and good heat transfer is thus insured.

With the present system, the burner is adjusted to operate at maximum efficiency with the fuel preheated to within a desired temperature range; in the order of 155° F. to 175° F. or thereabout with the boiler water temperature between 160° F. and 180° F. Such adjustment may be effected at the factory or at the place of installation. Thereupon in use, the maximum efficiency will be obtained for the fluid fuel employed for the fuel will be maintained at a substantially uniform elevated temperature to which the operation of the burner has been adjusted for maximum efficiency. When maintenance of the furnace, change in temperature range or quality of fuel requires, the burner may be adjusted to such changed conditions.

The simplicity of installation of a fluid fuel burning boiler embodying my invention where the fuel line passes directly through the boiler and is connected to the storage source at the rear of the boiler without the difficulty of positioning a tube or other conduit inside the decorative cabinet is another important advantage to the boiler dealer for it further simplifies installation. This is particularly true where a completely preassembled boiler-burner unit is supplied to the dealer.

The invention has been described in detail, using a hot water heating system for domestic house heating as an illustration. If a steam, vapor, or indirect hot air system is employed, the conduit 9 (and the tube 20 if the arrangement as shown in Figure 2 is used) may be positioned in much the same manner as shown in the drawings, for in all such systems the water level in the boiler is above the lower half of the boiler. My system will be equally applicable to fluid fuel fired domestic hot water heating boilers, industrial and commercial boilers, and the like. Water heaters are not essentially different from the described heating system, except that a tankless coil or a hot water storage tank is employed and there may be no radiators connected to the system. Likewise, with hot water, steam, vapor, and indirect hot air systems provided with a so-called "summer-winter hook-up" in which the boiler serves as an indirect water heater only and during summer months no heat is conducted to the rooms or other areas normally heated by the system, the present invention is advantageous. In place of a fuel oil burner other fluid fuels and burners may be used.

While I have illustrated and described certain preferred embodiments of my invention, it will be understood that the same may be otherwise embodied and practiced within the scope of the following claims.

I claim:

1. In a boiler burner unit, a boiler formed of an inner fire box member and an outer shell member defining a heat transfer fluid receiving compartment therebetween, an oil burner mounted to direct a heating flame within the fire box member of the boiler to supply heat to heat transfer fluid in said compartment, control means disposed within said compartment for actuating said oil burner in accordance with the temperature of heat transfer fluid in said compartment to maintain the temperature thereof within a predetermined range, and a fluid fuel conduit passing through said heat transfer fluid receiving compartment and connecting said burner with a source of fluid fuel supply, whereby the fuel passing through said heat transfer fluid compartment will be elevated to a substantially uniform temperature within said predetermined range.

2. In a boiler burner unit, a boiler formed of an inner fire box member and an outer shell member defining a heat transfer fluid receiving compartment therebetween, an oil burner mounted to direct a heating flame within the fire box member of the boiler to supply heat to heat transfer fluid in said compartment, control means disposed within said compartment for actuating said oil burner in accordance with the temperature of heat transfer fluid in said compartment to maintain the temperature thereof within a predetermined range, a tube extending through said heat transfer fluid receiving compartment into aligned openings in said outer shell member and sealed against said outer shell member about said openings, and a fluid fuel conduit passing through said tube in said heat transfer fluid receiving comparement and connecting said burner with a source of fluid fuel supply, whereby the fuel passing through said heat transfer fluid compartment will be elevated to a substantially uniform temperature within said predetermined range.

EARL C. STAUFFER.

REFERENCES CITED

The following references are of record in the file of this patent:

UNITED STATES PATENTS

| Number | Name | Date |
|---|---|---|
| 28,789 | Sterling | June 19, 1860 |
| 1,103,121 | Allen | July 14, 1914 |
| 1,204,779 | Junkers | Nov. 14, 1916 |
| 1,357,309 | Best | Nov. 2, 1920 |
| 1,406,766 | Shipp | Feb. 14, 1922 |
| 1,452,261 | Warner | Apr. 17, 1923 |
| 1,562,910 | Nock | Nov. 24, 1925 |
| 1,563,608 | Wood | Dec. 1, 1925 |
| 1,590,248 | Machado | June 29, 1926 |
| 1,942,436 | MacDonald | Jan. 9, 1934 |
| 1,950,499 | Leins | Mar. 13, 1934 |
| 2,042,860 | Peabody | June 2, 1936 |
| 2,094,908 | Thrall | Oct. 5, 1937 |
| 2,210,830 | Bernhard | Aug. 6, 1940 |
| 2,320,821 | Jimenez | June 1, 1943 |

FOREIGN PATENTS

| Number | Country | Date |
|---|---|---|
| 107,466 | Great Britain | July 5, 1917 |
| 450,972 | Germany | Oct. 18, 1927 |